May 25, 1954  F. G. CLARK  2,679,278
APPARATUS FOR ASSEMBLING TANK BODIES
Filed Jan. 13, 1951  7 Sheets-Sheet 1

INVENTOR.
FRANK G. CLARK
BY Paul, Paul & Moore
ATTORNEYS

May 25, 1954  F. G. CLARK  2,679,278
APPARATUS FOR ASSEMBLING TANK BODIES
Filed Jan. 13, 1951  7 Sheets-Sheet 4

INVENTOR.
FRANK G. CLARK
BY
Paul, Paul & Moore
ATTORNEYS

May 25, 1954  F. G. CLARK  2,679,278
APPARATUS FOR ASSEMBLING TANK BODIES
Filed Jan. 13, 1951 7 Sheets-Sheet 5

INVENTOR.
FRANK G. CLARK
BY
ATTORNEYS

May 25, 1954     F. G. CLARK     2,679,278
APPARATUS FOR ASSEMBLING TANK BODIES
Filed Jan. 13, 1951     7 Sheets-Sheet 6

INVENTOR.
FRANK G. CLARK
BY Paul, Paul & Moore
ATTORNEYS

FIG.13

Patented May 25, 1954

2,679,278

UNITED STATES PATENT OFFICE 2,679,278

APPARATUS FOR ASSEMBLING TANK BODIES

Frank G. Clark, Minneapolis, Minn., assignor to Brown Steel Tank Company, Minneapolis, Minn., a corporation of Minnesota Application January 13, 1951, Serial No. 205,903

6 Claims. (Cl. 153—2)

This invention relates to new and useful improvements in apparatus for assembling tank bodies.

In the past it has been customary in the construction of large tank bodies to preform the tank heads or ends and also the side wall or shell of the tank, the latter usually being preformed by rolling, to form a hollow body or cylinder, open at each end, and into the ends of which the tank heads are subsequently fitted and suitably secured, and the contiguous edges of the tank shell being secured together in the usual manner.

The above method of constructing and assembling tank bodies is quite expensive in that it requires that the sheet constituting the shell of the tank be handled several times, first in the operation of rolling the sheet into a cylinder, and secondly, when fitting the tank heads into the cylinder and securing them thereto.

The present invention facilitates the operation of assembling the parts of a tank in that the main body sheet is not rolled into a cylinder before the assembling operation, as in the past, but is merely cut or blanked to a predetermined size.

The blank of sheet metal is then brought into engagement with the tank ends by placing the tank heads on the ends of the sheet and wrapping the opposed side portions thereof upwardly around the tank ends. During this operation, the peripheries of the tank heads serve as forms for shaping the sheet while bending it into a cylindrical or oval shape, with the assurance the marginal side edges of the sheet will firmly seat against the peripheries of the tank heads so that the ends of the sheet may readily and expeditiously be secured thereto to provide leakproof seams or joints.

Generally, the machine comprises two pairs of arms, one pair located at each side of the machine, and each pair carrying an elongated roller. The blank of sheet metal which is to form the tank shell or body, is placed in the machine, over said rollers. The arms are then set into motion whereupon the rollers engage the opposed side portions of the sheet and upwardly bend or wrap the sheet around the tank heads until the marginal side edges of the sheet are brought into contiguous relationship, whereby they may be welded together to form a leakproof seam. The sheet is secured to the tank heads as the sheet is wrapped around said heads, thereby to complete the assembling of the parts of the tank body.

An important object of the present invention therefore, is to provide an improved method of and apparatus for assembling tank bodies, whereby the operation of forming and securing the tank shell to the usual preformed tank heads may be greatly expedited.

A further and more specific object of the invention is to provide a machine for assembling tank bodies comprising a pair of elongated rollers mounted in pivoted arms which operate simultaneously to wrap the sheet around the tank heads or ends, after which the marginal ends of the sheet are secured to the tank heads by such means as welding.

A further object is to provide a machine for assembling tank bodies which comprises a minimum of operating parts, and which does not require the tank shell to be preformed before assembly, as is now customary.

A further object is to provide a machine of this general type wherein the tank heads or ends serve as forming dies in the operation of shaping the tank shell and assembling it with and securing it to the tank heads.

Other objects of the invention reside in the novel manner in which the roller supporting arms are interconnected for simultaneous operation; in the toggle mechanisms provided for simultaneously operating said arms; in the provision of a pneumatic device for simultaneously operating the sheet folding or bending arms; in the unique arrangement of the sheet-forming rollers whereby they may be utilized for preshaping the marginal side portions of the sheet metal blank prior to wrapping the sheet around the tank ends to facilitate bringing the side edges thereof into abutting relationship for welding; in the means for securing the tank heads in position upon the blank of sheet metal; in the unique control means provided for controlling the operation of the sheet forming arms and tank head securing means, whereby a single operator may readily and conveniently control the pivotal movement of said arms, and also the operation of the clamping beam for securing the tank heads in position upon the sheet prior to and during the wrapping of the sheet around the tank heads or ends; and in the provision of such a machine which is extremely simple and inexpensive, whereby it may be manufactured in quantity production at low cost.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claims which follow.

*Supporting frame*

The novel tank forming machine herein disclosed is shown comprising a suitable base, generally designated by the numeral 2, comprising side beams 3 and 4 and end members 5, all of which may be suitably welded together to provide a rigid support for the operating mechanism of the machine, subsequently to be described.

Figures 1, 12:
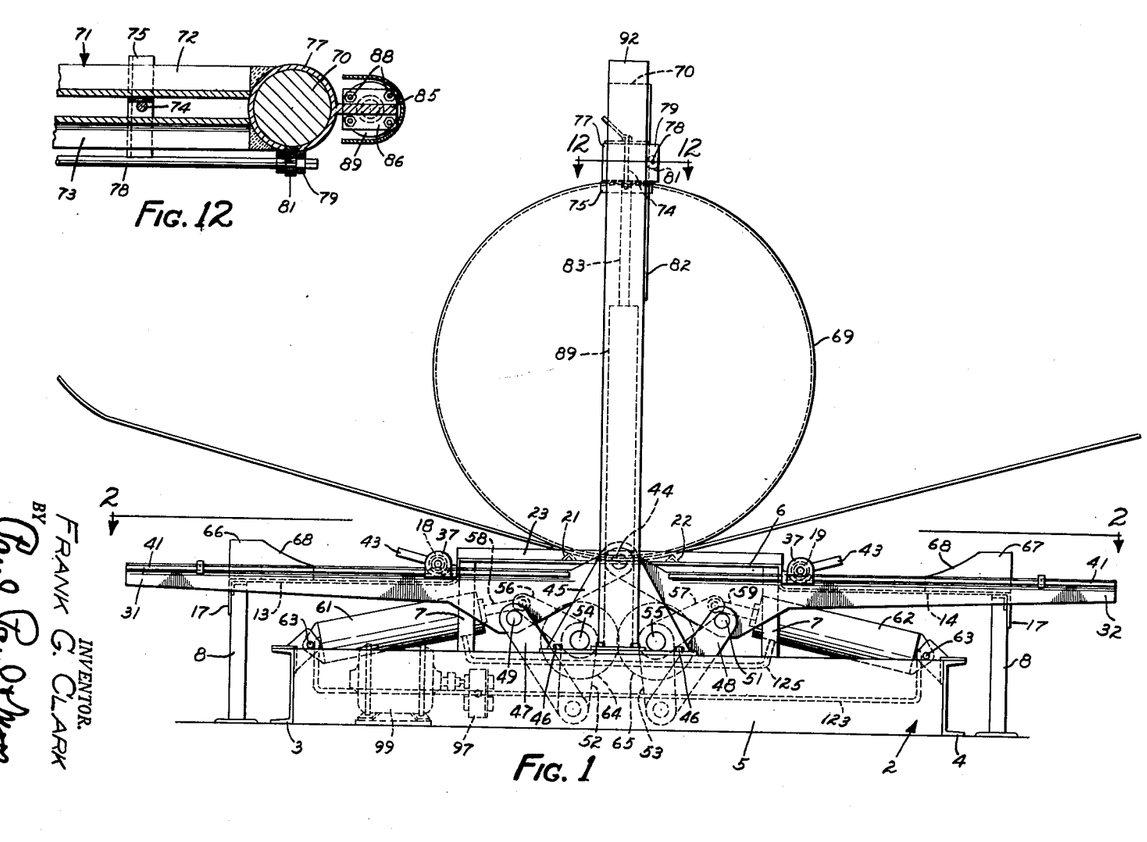
Figure 1 is an end view of the machine showing a blank of sheet metal positioned therein prior to wrapping it around the tank heads or ends positioned upon the opposed end edges of the sheet.
Figure 12 is a detail sectional view substantially on the line 12—12 of Figure 1, showing the interconnection between the guides provided at the ends of the clamping beam to retain it in parallel relation to the deck of the machine at all times.

A deck 6 is supported over the base 2 upon a suitable supporting structure, including uprights 7 and 8, suitable cross members 11, and longitudinally extending side members 9. Metallic plates 13 and 14 are secured to the uprights 7 and 8, longitudinal frame members 9, cross members 11, and end members 15 and 16, and have their inner edges bent upwardly to meet the opposed side edges of the deck plate 6, as best illustrated in Figure 1. The outer marginal edges of the top forming plates 13 and 14 are preferably bent downwardly, as shown at 17 in Figure 1, thereby to strengthen the structure.

In Figure 1 it will be noted the main deck 6 is disposed at an elevation above the side decks 13 and 14, thereby to allow space for the forming rollers 18 and 19, when in normal inoperative positions, as shown in Figure 1. When the rollers are thus positioned, a blank of sheet metal may readily be positioned in the machine without interference from the forming rollers.

*Sheet supporting means*

Figure 2:
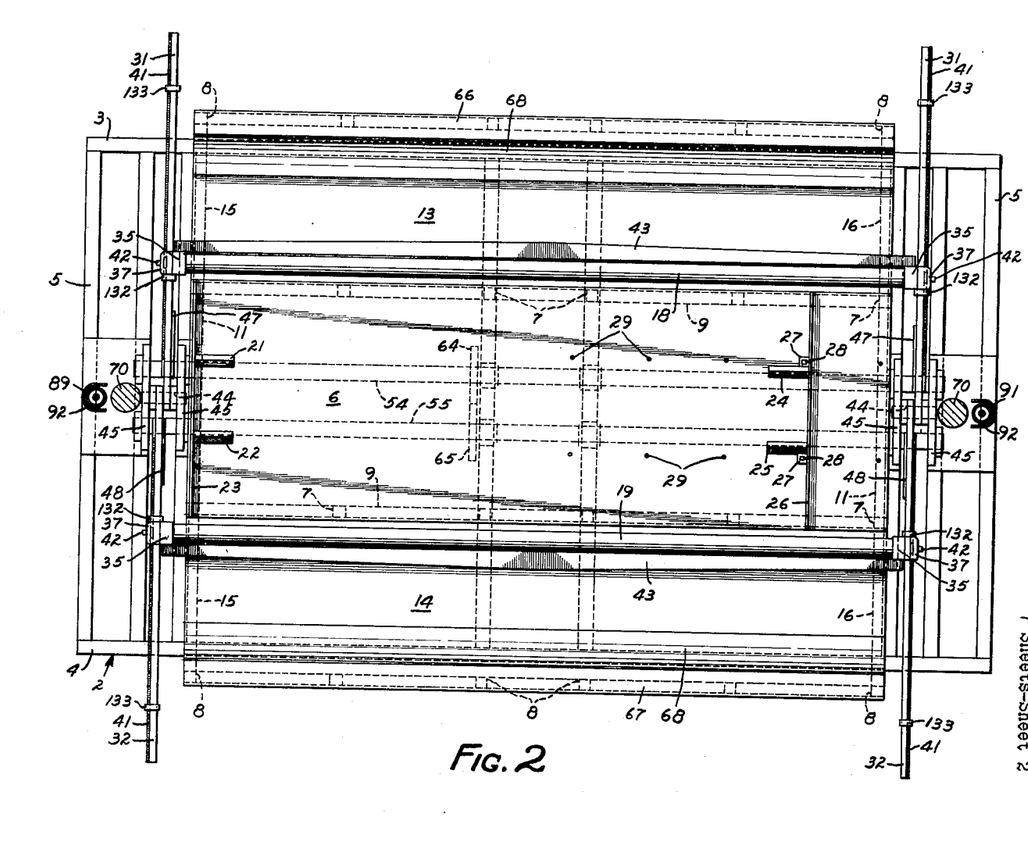
Figure 2 is a sectional plan view substantially on the line 2—2 of Figure 1, showing the V-blocks for supporting the tank heads and the sheet during the operation of forming the tank shell.

An important feature of the present invention resides in the novel manner in which the blank of sheet metal is supported in the machine during the bending or wrapping of the sheet around the tank ends. As best shown in Figures 1 and 2, spaced V-blocks 21 and 22 are secured to one end of the deck 6 and may be permanently secured thereto by a transversely disposed upright member 23, secured to the ends of the V-blocks 21 and 22, whereby it becomes in effect an integral part thereof.

Adjustably secured to the opposite end of the deck are similar V-blocks 24 and 25, each having one end secured to a transversely disposed upright member 26, shown provided with lugs or flanges 27, which may be apertured to receive suitable securinng bolts 28. The bolts 28 are receivable in slots or spaced apertures 29 provided in the deck 6, as indicated in Figure 2.

The V-blocks 21—22 and 24—25 cooperate to support the blank in spaced relation to the deck 6, as shown in Figure 1. The spacing between the V-blocks lengthwise of the machine is determined by the length of the tank to be formed, it being understood that the V-blocks are so adjusted that the upright cross members 23 and 26 to which the V-blocks are secured, are so spaced as to substantially engage the end edges of the blank sheet of metal, when placed upon the V-blocks prior to the bending operation.

*Supporting means for sheet bending rollers*

Figure 10:
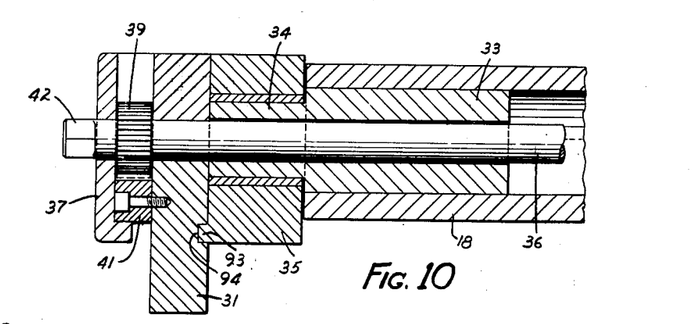
Figure 10 is a detailed sectional view on the line 10—10 of Figure 6, showing the mounting of the sheet forming rollers on their respective supporting arms.

The means provided for operating the sheet forming rollers 18 and 19 is shown comprising two pairs of opposed arms 31 and 32, one pair being located at each end of the deck 6. The forming rollers 18 and 19 are preferably of tubular stock, as illustrated in Figure 10, and plugs 33 are secured in the opposed ends of each roller. Each plug is shown having one end projecting from the roller which is preferably turned down to provide a pintle 34. These pintles are rotatably received in suitable bearing blocks 35, mounted for sliding movement on their respective arms 31 or 32.

Means is provided for maintaining the forming rollers 18 and 19 in parallel relation relative to one another at all times, to assure accurate forming of the metallic sheet around the tank ends. To thus maintain the rollers 18 and 19 in paralʹel relation, a shaft 36 extends through each roller and each shaft has its end portions supported in suitable brackets 37 secured to their respective bearing blocks 35 by suitable bolts 38, as best illustrated in Figure 10. Secured to the ends of shafts 36 are pinions 39 mounted for traveling movement in rack bars 41 secured to the operating arms 31 and 32. At least one end of each shaft 36 is squared as shown at 42, whereby a wrench or crank may be applied thereto for manually rotating the shafts to translate the forming rollers lengthwise on the arms 31 and 32, if necessary.

Figure 9:
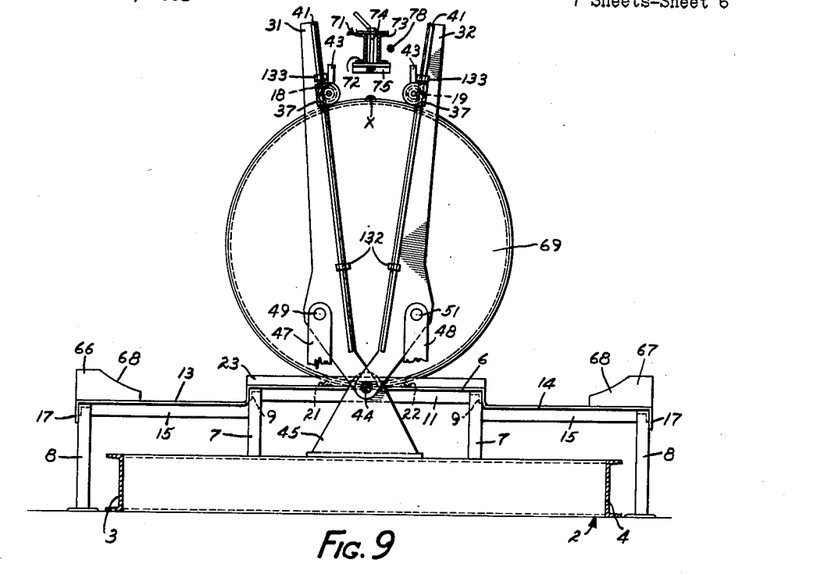
Figure 9 is a view showing the clamping beam moved out of engagement with the tank ends and the sheet completely wrapped about the tank ends with its marginal side edges disposed in abutting relation, in which position they are retained by the forming rollers while welding the joint therebetween.
Figure 11:
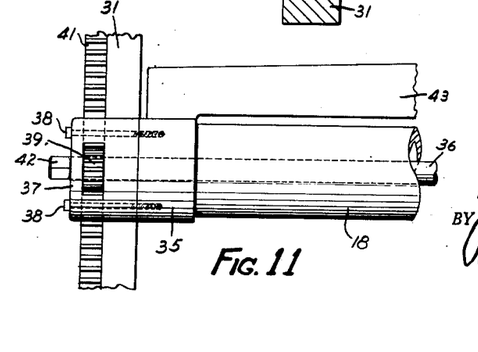
Figure 11 is a top view of Figure 10, showing the tie bar between the bearing blocks of each forming roller.

To retain the bearing blocks 35 of each forming roller 18 or 19, in accurately spaced relation, a tie bar 43 is interposed therebetween and has its ends suitably welded or otherwise permanently secured thereto, as indicated in Figures 2 and 11. The rack bars 41 extend substantially the full length of their respective arms 31 and 32, as will be noted by reference to Figure 1. The inner ends of arms 31 and 32 are pivoted to aligned pivots 44 supported in suitable brackets 45 shown secured to the machine frame at each end thereof, as best illustrated in Figures 1 and 9. Brackets 45 may be detachably secured to the end beams 5 of the machine frame by suitable bolts 46, or, if desired, they may be welded directly to the beams 5.

*Operating means for sheet bending rollers*

The means provided for simultaneously operating the forming arms 31 and 32 at each end of the machine is best illustrated in Figure 1, and is in the form of a toggle mechanism comprising a pair of links 47 and 48, each having one end pivoted to its respective operating arm, as indicated at 49 and 51. The opposite ends of links 47 and 48 are pivoted to arms 52 and 53, respectively, which in turn are secured to spaced shafts 54 and 55 mounted in suitable bearings provided in the end brackets 45.

Arms 56 and 57 are secured to shafts 54 and 55, respectively, and have their swinging ends pivotally connected to the piston rods 58 and 59 of a pair of hydraulic cylinders 61 and 62. The two cylinders are pivoted at 63 to suitable brackets secured to the side frame members 3 and 4, as illustrated in Figure 1. If desired, arms 56 and 57 may have their outer ends forked to receive the piston rods 58 and 59 in order to equalize the strains exerted on said arms, when the pistons are actuated to swing the forming arms 31 and 32 upwardly in the operation of wrapping the blank of sheet metal around the tank ends.

Means is provided for synchronizing the movements of the forming arms 31 and 32 to assure accurate bending of the sheet into contact with the peripheries of the tank heads. To thus synchronize the operation of said arms, shafts 54 and 55 are geared together by suitable gears 64 and 65, as indicated in dotted lines in the drawings. By thus gearing together shafts 54 and 55, the forming arms at each end of the machine will always operate simultaneously, whereby the forming rollers are maintained in parallel relation relative to one another and to the axis of the tank to be assembled, which is essential to accurately wrap the sheet around the tank ends.

*Means for preforming opposed side edges of sheet*

Another important feature of the invention resides in the means provided for preforming or bending the opposed side edges of the blank sheet of metal prior to wrapping it around the tank ends.

Figure 4:
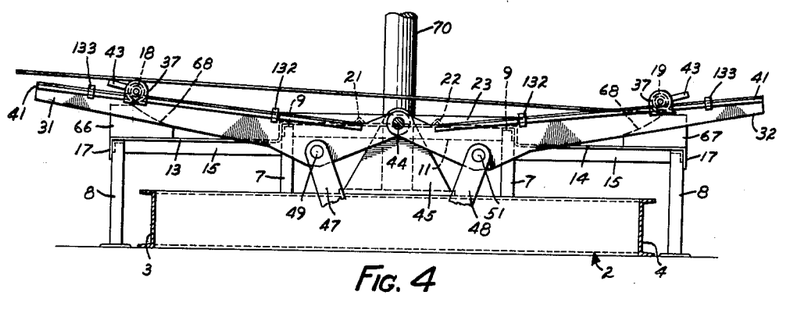
Figure 4 is a detail sectional view showing the means provided for pre-forming the opposed side edges of the blank before it is wrapped around the tank ends.
Figure 5:
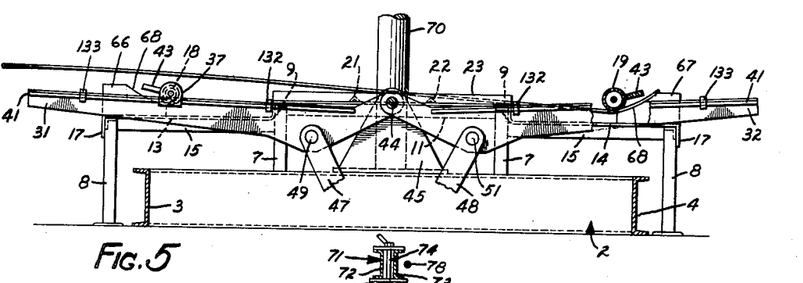
Figure 5 is a view similar to Figure 4, partially broken away to more clearly illustrate the actions of the rollers which force the marginal side portions of the sheet into forming engagement with the forming blocks.

The means provided for thus pre-shaping the opposed marginal side edges of the blank of sheet metal is best illustrated in Figures 1, 4 and 5, and comprises a pair of forming blocks or bars 66 and 67, shown secured to the outer marginal edge portions of the side decks 13 and 14. These forming blocks preferably extend the full length of the machine frame and have curved surfaces 68 against which the marginal side edge portions of the sheet are alternately pressed by the forming rollers 18 and 19.

In the initial operation of shaping the tank shell, one of the marginal side edge portions thereof is placed on one of the forming blocks 67, as shown in Figure 4, and the forming roller 19 is then brought into engagement with the edge portion of the sheet. The forming arms 32 are next swung downwardly, whereby the roller 19 will engage the top surface of the sheet and bend or roll the marginal edge portion thereof into the form shown in Figure 5, the roller moving inwardly relative to the arms 32, as a result of the downwardly curved face 68 of the forming block 67, and the slidable mounting of roller 19 on arms 32.

Figure 6:
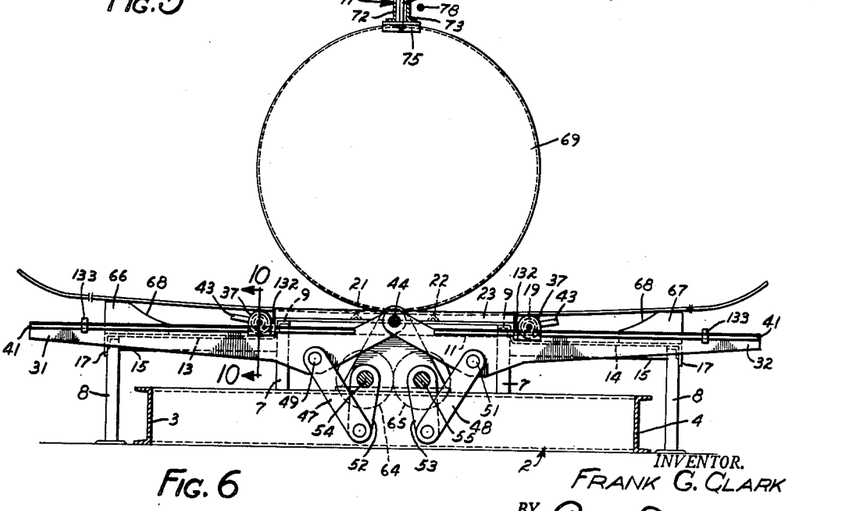
Figure 6 is a similar view showing the blank after its opposed side portions have been pre-formed and the tank ends being in operative positions on the sheet.
Figure 7:
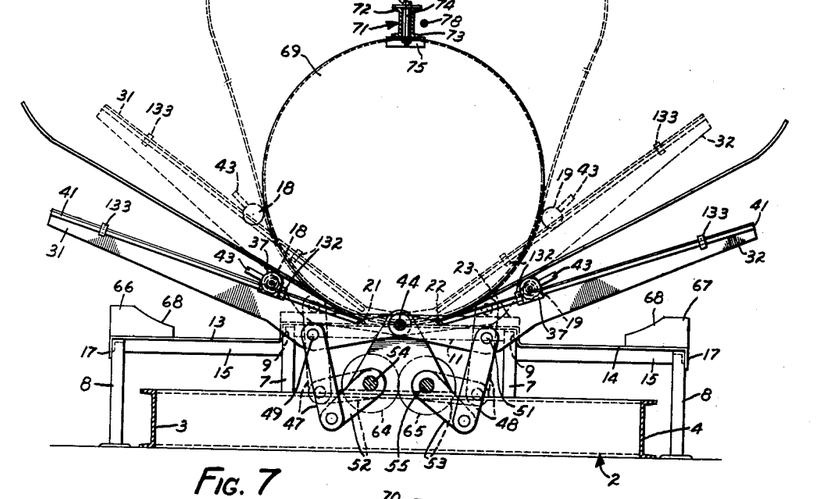
Figure 7 is a view showing in full and dotted lines the action of the forming rollers when initially swung upwardly to bend or wrap the blank of sheet metal around the tank ends.

When the pre-shaping of said marginal edge portion of the sheet has been completed, the forming arms 32 are released and the opposite side edge portion of the sheet is similarly preshaped by the use of forming block 66 and forming roller 18. When the two side edge portions of the sheet have thus been pre-shaped or formed, the sheet is placed on the V-blocks 21—22 and 24—25, as shown in Figure 6, and the tank ends or heads 69 are then placed upon the marginal end edge portions of the sheet and secured in operative positions thereon by a suitable clamping device, next to be described.

*Clamping means for tank heads and body sheet*

Figure 3:
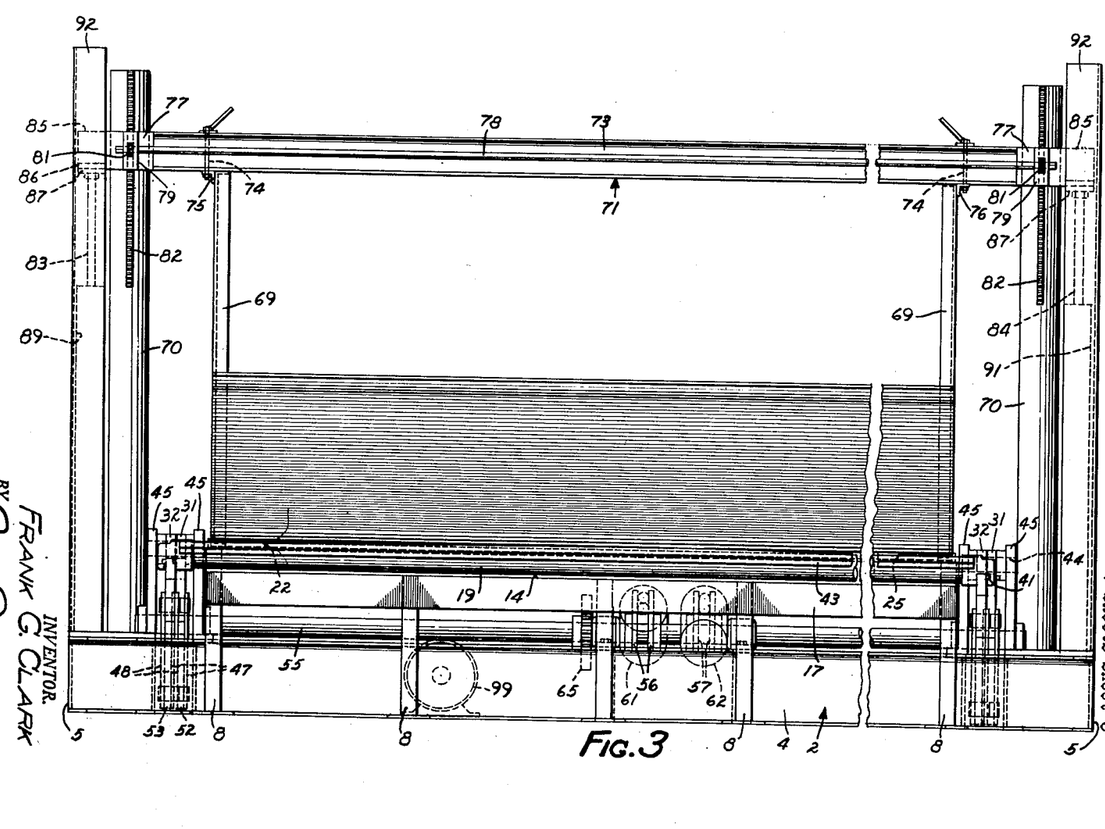
Figure 3 is a side elevation of Figure 1.

The means for firmly securing the tank ends 69 in position on the blank sheet of metal during the bending of the sheet around the tank heads is clearly illustrated in Figures 3, and 6 to 9, inclusive, and consists of a longitudinally extending beam, generally designated by the numeral 71. This beam, as best illustrated in Figure 3, comprises opposed channels 72 and 73, arranged back-to-back, with a space therebetween for receiving bolts 74, which slidably support a pair of stop elements 75 and 76 adapted to be engaged by the upper portions of the tank ends 69, to correctly position them in the machine. See Figure 3.

The clamping beam 71 is vertically adjustable upon upright columns or posts 70 having their lower ends firmly secured to the supporting frame 2 of the machine. Cylindrical guides 77 are secured to the ends of the channels 72 and 73 of the clamping beam 71 adapted to receive the cylindrical columns 70, as best illustrated in Figure 12, whereby the channels and guides 77 become, in effect, an integral unit adapted for up and down movement upon the columns 70.

Means is provided for maintaining the beam 71 in true parallel relation to the deck 6, and is shown comprising a shaft 78 having its ends rotatably supported in suitable bearings 79 provided in the guides 77, as shown in Figures 3 and 12. Pinions 81 are secured to the end portions of the shaft 78 and travel in racks 82 secured to the columns 70. The terminals of the shaft 78 project beyond the bearings 79 and are preferably squared, as indicated in the drawings, whereby a wrench or crank may be applied thereto for manually rotating the shaft 78 in the event that it is desired to manually vertically translate the clamping beam 71 upon the columns 70.

Operating means for clamping beam

The vertical movement or adjustment of the clamping beam 71 is preferably accomplished hydraulically. To thus operate the beam, each guide 77 is shown provided with a lateral extension 85 provided at their lower ends with plate portions 86 to which similar plate portions 87 of a pair of piston rods 83 and 84 are secured by such means as bolts 88. See Figures 3 and 12. The piston rods 83 and 84 are provided with suitable pistons, not shown, contained in cylinders 89 and 91, having their lower ends secured to the supporting frame of the machine, as will be understood by reference to Figures 1 and 3. Suitable semi-cylindrical guards 92 enclose the piston rods 83 and 84 and cylinders 89 and 91, and have their lower ends suitably secured to the machine frame, as will be understood by reference to Figure 1.

Another important feature of the present invention resides in the unique construction of the mounting means for the forming rollers 18 and 19, whereby they are adapted for longitudinal traveling movement upon their respective supporting arms 31 and 32, during the forming or bending of the sheet around the tank ends. As best illustrated in Figure 10, each bearing block 35 is provided at its lower end with an outwardly extending tongue 93 mounted for sliding movement in longitudinally extending grooves 94 provided on the inner surfaces of the forming arms 31 and 32. The tongues 93 prevent the bearing blocks from relatively rotating with respect to their supporting arms, but permit said bearing blocks to slide longitudinally on the arms 31 and 32 during the operation of wrapping a blank of sheet metal around the tank ends. By thus mounting the rollers 18 and 19, they will follow the contour of the tank ends as the body sheet is wrapped therearound, as clearly illustrated in Figures 7, 8 and 9.

Hydraulic control means

Figure 13:
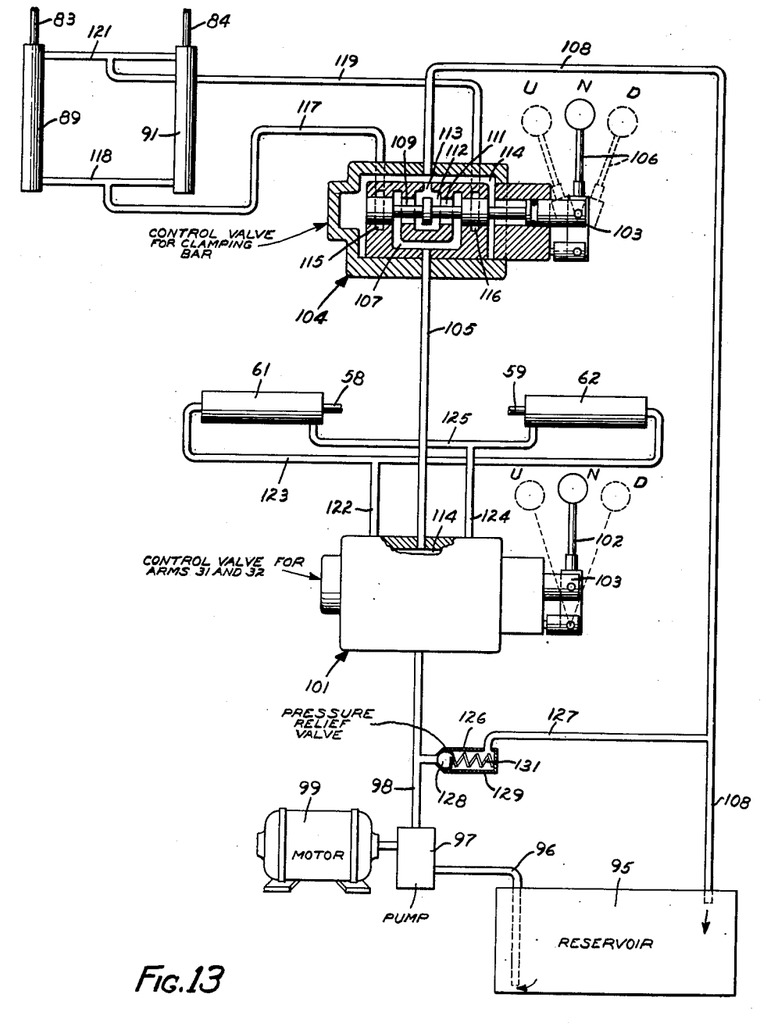
Figure 13 is a diagrammatic view illustrating the hydraulic control system.

As hereinbefore stated, the operation of the present machine is preferably hydraulically controlled, as illustrated in Figure 13. As herein disclosed, a fluid supply tank or reservoir 95 is shown having one end of a suction conduit 96 disposed therein. The opposite end of conduit 96 is connected to the intake side of a suitable pump 97, having one end of a conduit 98 connected to the pressure side thereof. The pump may be directly driven by a suitable motor 99.

The pressure conduit 98 is connected to the intake side of a suitable control valve, generally designated by the numeral 101, having an operating lever 102 connected to the usual piston or slide 103 of the valve. A similar control valve 104 is shown connected in series with the valve 101 by a conduit 105, and has an operating lever 106. The valves 101 and 104 are preferably identical in construction, and each comprises a piston or slide 103, which are adapted for independent operation by manipulation of the valve operating levers 102 and 106. The body of each valve comprises a fluid chamber 107, which normally is open to the discharge side of the valve body, when the valve slide 103 is in its neutral position, as shown in valve 104. When the valve slides are thus positioned, the fluid entering chamber 107 of valve 101 will flow through passages 109 and 111 into a central chamber 112, and thence through passage 113 into chamber 114 of valve 101, and through conduit 105, valve 104, and return conduit 108, back to the reservoir 95.

Each valve also has axially spaced annular chambers 115 and 116. Chamber 115 of valve 104 has one end of a conduit 117 in communication therewith, the opposite end of which is connected to a branch conduit 118 having its ends in communication with the lower ends of the cylinders 89 and 91 of the clamping bar 71, below the pistons mounted therein. Chamber 116 of valve 104 has one end of a conduit 119 in communication therewith, the opposite end of which is connected to a cross conduit 121 in communication with the upper ends of cylinders 89 and 91, as clearly illustrated in Figure 13.

Control valve 101, which controls the operation of the forming arms 31 and 32, has a conduit 122 leading from its chamber 115 to a cross conduit 123 having its ends in communication with the bottom ends of cylinders 61 and 62. A conduit 124 connects chamber 116 of valve 101 to a cross conduit 125, the ends of which are connected to the upper ends of cylinders 61 and 62, as clearly illustrated in Figure 13.

A pressure relief valve 126 is preferably provided in a by-pass conduit 127 for by-passing fluid back to the supply tank or reservoir 45, in the event that the flow of fluid to the cylinders should accidentally become interrupted. The pressure relief valve may be of conventional design, and is shown comprising a spring-biased check ball 128, confined within a casing 129 and normally retained in closed position by a spring 131, against the pressure of the fluid in conduit 98. Under normal operating conditions, the valve remains closed. It opens only in the event that an abnormally high pressure should develop in conduit 98.

Operation

In the operation of the novel machine herein disclosed, the motor 99 is first started whereby the pump 97 is actuated to circulate fluid through the valves 101 and 104, it being understood the valve operating levers 102 and 106 of the two valves are normally in neutral position, as shown in full lines in Figure 13, prior to starting the machine. The control lever 102 of valve 101 is then shifted to position U, whereby the valve 101 will direct the pressure fluid into the bottoms of cylinders 61 and 62, thereby to cause arms 31 and 32 to move upwardly from the positions shown in Fig. 1, to that shown in Fig. 4.

The operator then manually slides roller 19 outwardly to a position adjacent to the forming block 67. A blank of sheet metal is next inserted into the machine with one of its side edges entering between the roller 19 and the top of the forming block 67, after which the control lever 102 of valve 101 is shifted to position D, thereby forcing roller 19 into engagement with the sheet, whereby the sheet is pressed firmly against the curved surface 68 of die block 67 to pre-form the sheet, as illustrated in Figure 6. The same operation is repeated to similarly shape the opposite side edge of the sheet, by manipulation of arms 31 relative to forming block 66.

When the opposed side edge portions of the sheet have thus been preformed, arms 31 and 32 are lowered to their normal horizontal positions by manipulation of control lever 102 of valve 101, after which the sheet is placed on the V-blocks 21, 22, 24 and 25, preparatory to being wrapped around the tank ends to complete the formation of the tank shell.

The tank heads or ends 69 are next placed upon the end portions of the blank with their lower portions engaging the stop members 23 and 26 of the V-blocks and their upper portions engaging the stop angles 75 and 76 of the clamping beam 71, as illustrated in Figure 3. When the tank heads have been thus positioned upon the sheet, the operator shifts control lever 106 of valve 104 to position D, whereupon fluid will enter the upper ends of cylinders 89 and 91 and thus cause the piston rods 83 and 84 to move the clamping beam 71 downwardly into engagement with the upper portions of the tank heads and firmly press them downwardly against the sheet until the sheet assumes substantially the position shown in Figure 1.

The operator then shifts control lever 102 of valve 101 to position U, whereby valve 102 will direct the pressure fluid into the lower ends of cylinders 61 and 62, and thereby cause the piston rods 58 and 59 to be projected from cylinders 61 and 62, as will be understood by reference to Figures 1 and 13. Such actuation of pistons 58 and 59 will impart a rocking motion to shafts 54 and 55, whereby the toggle mechanisms (links 47—52 and 48—53) are actuated to swing the forming arms 31 and 32 upwardly, as indicated by the full and dotted lines in Figure 7.

Figure 8:
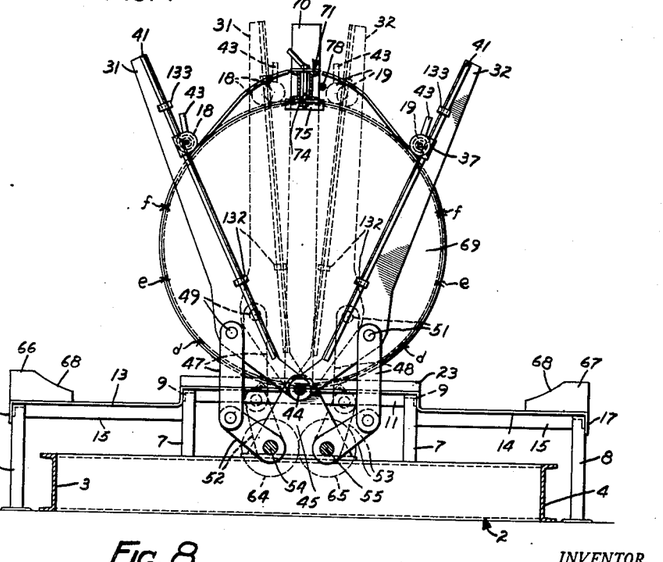
Figure 8 is a view similar to Figure 7, showing in full lines the positions of the forming rollers when the preformed edge portions of the sheet have been brought into close proximity to the clamping beam which holds the tank ends or heads in position during the forming operation.

As the arms continue their upward movement, the forming rollers 18 and 19, because of their slidable mounting on the arms 31 and 32, will follow the contours or peripheries of the tank heads, with the metallic sheet interposed between said rollers and the peripheries of the tank heads, until the arms reach the positions shown in Figure 8. During such operations of the arms, the forming rollers 18 and 19 move outwardly on the arms as a result of the unique mounting of the bearing blocks 35 and bracket, thereby firmly wrapping the sheet around the tank ends and maintaining it in firm contact with the peripheries thereof. Simultaneously, as the sheet is wrapped around the tank ends, a welder tack welds the sheet to the tank ends at spaced intervals around the circumference thereof, as indicated at d, e, and f, in Figure 8. Control valve 104 is preferably so designed that when the operator releases his grasp on the control lever, the valve piston or slide 103, thereof will always return to its neutral position N, as shown in Figure 13. When so positioned, the conduits 117 and 119 are closed to the circulation of fluid, whereby the fluid in the upper or lower ends of cylinders 89 and 91 may be retained therein under pressure, depending upon the position of the valve lever 106. Valve 101 is similarly constructed.

When the sheet has been bent to the form shown in Figure 8, the operator swings the control lever 106 of valve 104 from position N to position U, whereby the pressure fluid will enter the lower ends of cylinders 89 and 91 and project the pistons 83 and 84 therefrom to lift the clamping beam 71 out of engagement with the tank heads, as illustrated in Figure 9. The forming arms 31 and 32 are then moved inwardly to the dotted line positions shown in Figure 8, by manipulation of control lever 102, whereby the pre-formed side edge portions of the sheet are brought into metal-to-metal contact with the peripheries of the tank ends, and at the same time the longitudinal edges of the sheet are brought into abutting relation with each other, as shown in Figure 9. A welder then welds together the abutting side edges of the sheet, as indicated at X in Figure 9, thereby to complete the assembling of the tank shell and tank ends.

Arms 31 and 32 are then returned to their normal horizontal positions, as shown in Figure 1, to permit removal of the assembled tank from the machine, after which the welder completes the welding of the tank heads to the shell, and also completes the welding of the longitudinal seam of the tank shell. In some instances, it may be deemed unnecessary to preform the opposed side edges of the blank, as shown in Figure 6.

The novel machine herein disclosed has proven very efficient and practical in operation. It completely eliminates the usual operation of forming the tank shell to the correct diameter by rolling. It also eliminates the problem of assembling the tank heads or ends in the ends of the shell as a separate operation. The hydraulic operating mechanism comprises a very flexible control, whereby the operation of the forming arms may be accurately controlled with a minimum of effort. It will also be noted that the preforming of the marginal side edge portions of the sheet, prior to wrapping the blank around the tank ends, is accomplished on the same machine.

The sliding action of the forming rollers 18 and 19 upon their respective supporting arms is also important in that it causes the arms to follow the contour of the tank heads, regardless of whether the resultant tank is cylindrical or slightly oval in cross-section. The mounting of the forming rollers upon their respective arms is preferably such that they will return by gravity to their normal positions against suitable stop elements 132, adjustably secured to the arms 31 and 32, as shown in Figure 9. Suitable stops 133 may also be provided adjacent the upper ends of the arms for limiting the outward movement of the rollers on said arms. These stops are readily adjustable to adapt the machine for tanks of different diameters.

The machine is extremely simple in construction and does not depend upon the services of a skilled mechanic for its operation. By the employment of the novel machine herein disclosed, a flat blank of sheet metal may be quickly wrapped around the tank ends to complete the formation of the tank shell without the use of forming dies; the tank ends serving as dies for forming the sheet as it is wrapped or bent therearound. In the foregoing, the tank ends are shown provided with peripheral flanges. It is to be understood, however, that the invention is not to be so limited, as there may be instances where it might be deemed more desirable to utilize flat disks for the tank heads in lieu of peripherally flanged heads, as herein shown.

The foregoing detailed description has been given for clearness of understanding only, and no unnecessary limitations should be understood therefrom, but the appended claims should be construed as broadly as permissible in view of the prior art.

I claim as my invention:

1. In a machine for assembling large tank bodies, a frame comprising a deck having longitudinally extending laterally spaced parallel V-blocks thereon for supporting a blank of sheet metal of a predetermined size, a vertically movable clamping bar mounted over the deck for engaging and supporting a pair of tank heads in upright positions on said blank, one at each end thereof, oppositely disposed arms mounted for pivotal movement about a common axis, bearing blocks mounted for free sliding movement on said arms and carrying a pair of rollers, said rollers normally being positioned adjacent to the side edges of the deck and being movable into engagement with the bottom of the blank, upon actuation of said arms, thereby to completely wrap the blank around the tank heads, the slidable mounting of said bearing blocks permitting the blank forming rollers to freely follow the contours of the tank heads and thereby firmly roll the blank into intimate contact with the peripheries of said tank heads.

2. A machine according to claim 1, wherein a toggle mechanism is connected to said arms, and hydraulic means is provided for actuating said toggle mechanism.

3. In a machine for assembling large tank bodies, a frame having a deck thereon for supporting a blank of sheet metal which is to form the shell of the tank, means for supporting a tank head on each end of said blank, a pair of opposed arms pivotally mounted at each end of the machine frame, the corresponding arms of said pairs of arms cooperating to support a pair of elongated rollers normally disposed in spaced parallel relation adjacent to the side edges of said deck, bearing blocks mounting said rollers for longitudinal sliding movement on their respective arms, means for maintaining said rollers in parallel relation, and hydraulic means for moving said arms into engagement with the bottom surface of the blank and bending the side portions thereof upwardly, and inwardly around the tank heads, said rollers following the peripheries of the tank ends and firmly pressing the blank into direct contact therewith until the opposed side edges of the blank are brought into contiguous relation so that said side edges may be welded together and the ends of the blank welded to the tank ends, thereby to complete the assembling of the tank body.

4. A machine according to claim 3, wherein a hydraulically operated clamping bar is provided for securing the tank ends in position on the blank during the wrapping of the blank around the tank ends.

5. In a machine for assembling large tank bodies, a base having a deck for supporting a blank of sheet metal, means for supporting a tank head on each end of said blank, a pair of opposed arms pivotally mounted at each end of the machine frame and normally horizontally disposed, a longitudinally extending rack bar on each arm, the corresponding arms of said pairs of arms cooperating to support a pair of rollers disposed lengthwise of the machine frame, bearing blocks mounting said rollers for longitudinal sliding movement upon their respective arms, a shaft extending lengthwise through each roller and having pinions secured to their ends adapted to freely roll in said rack bars, thereby to maintain said rollers in true parallel relation, a toggle mechanism at each end of the machine for operating said arms, a pair of spaced parallel shafts operatively connecting together said toggle mechanisms, means gearing together said shafts for simultaneous operation in opposite directions, thereby to synchronize the operations of said arms, and hydraulic means for actuating said arms and causing them to engage and wrap the blank around the tank ends, until its opposed side edges are brought into contiguous relation to facilitate welding them together.

6. A machine according to claim 5, wherein a pair of forming bars are secured to the machine frame in spaced parallel relation adapted to cooperate with said blank bending rollers to preform each marginal side edge portion of the blank, prior to wrapping the blank around the tank ends, thereby to facilitate bringing the side edges of the blank into abutting relation to complete the formation of the tank shell.

References Cited in the file of this patent

UNITED STATES PATENTS

| Number | Name | Date |
|---|---|---|
| 788,969 | Walker | May 2, 1905 |
| 1,371,833 | Youtsey | Mar. 15, 1921 |
| 1,770,763 | Wolfstyn | July 15, 1930 |
| 1,831,033 | Richter | Nov. 10, 1931 |
| 1,925,118 | Stresau | Sept. 5, 1933 |
| 2,277,519 | Laxo | Mar. 24, 1942 |
| 2,459,954 | Morgan, Jr. | Jan. 25, 1949 |
| 2,480,369 | Jasper | Aug. 30, 1949 |
| 2,489,802 | Needham | Nov. 29, 1949 |
| 2,490,795 | Gay | Dec. 13, 1949 |
| 2,497,622 | Mueller | Feb. 14, 1950 |
| 2,517,853 | Eickmeyer et al. | Aug. 8, 1950 |